United States Patent [19]
Chandler

[11] Patent Number: 4,894,755
[45] Date of Patent: Jan. 16, 1990

[54] RETRACTABLE TIRE CHANGE LIGHTS FOR AUTOMOTIVE VEHICLES

[76] Inventor: Daniel E. Chandler, P.O. Box 1893, Cave Creek, Ariz. 85331

[21] Appl. No.: 260,530

[22] Filed: Oct. 21, 1988

Related U.S. Application Data

[63] Continuation-in-part of Ser. No. 184,937, Apr. 22, 1988, Pat. No. 4,802,069.

[51] Int. Cl.$^4$ .................................................. B60Q 1/32
[52] U.S. Cl. ...................................... 362/83; 362/269; 362/427; 340/472
[58] Field of Search .................... 362/61, 66, 78, 80, 362/81, 83, 269, 285, 287, 418, 427; 340/138, 142, 471, 472

[56] References Cited
U.S. PATENT DOCUMENTS

| | | | |
|---|---|---|---|
| 2,557,872 | 6/1951 | Holland | 362/83 |
| 2,786,935 | 3/1957 | Geary | 362/83 |
| 3,017,500 | 1/1962 | Pezzopane | 362/83 |
| 3,435,200 | 3/1969 | Massoll et al. | 362/83 |

Primary Examiner—Stephen F. Husar
Attorney, Agent, or Firm—Louise S. Heim

[57] ABSTRACT

A set of tire change lights for illuminating the tires of an automotive vehicle during a tire-changing operation comprises four lights, each of which is mounted near the wheel well above a different one of the vehicle's tires. Each light includes a light source, such as a light bulb, which may be mounted inside a reciprocable lamp housing or on the inner surface of a pivotable door, either of which enables the light to be moved from a concealed position within the body of the car to an external position suitable for illuminating a tire. The light source is electrically connected in series to the battery of the vehicle by means of a normally open control switch which closes to activate the light source when the light is in its external position and opens to deactivate the light source when the light is in its concealed position.

13 Claims, 3 Drawing Sheets

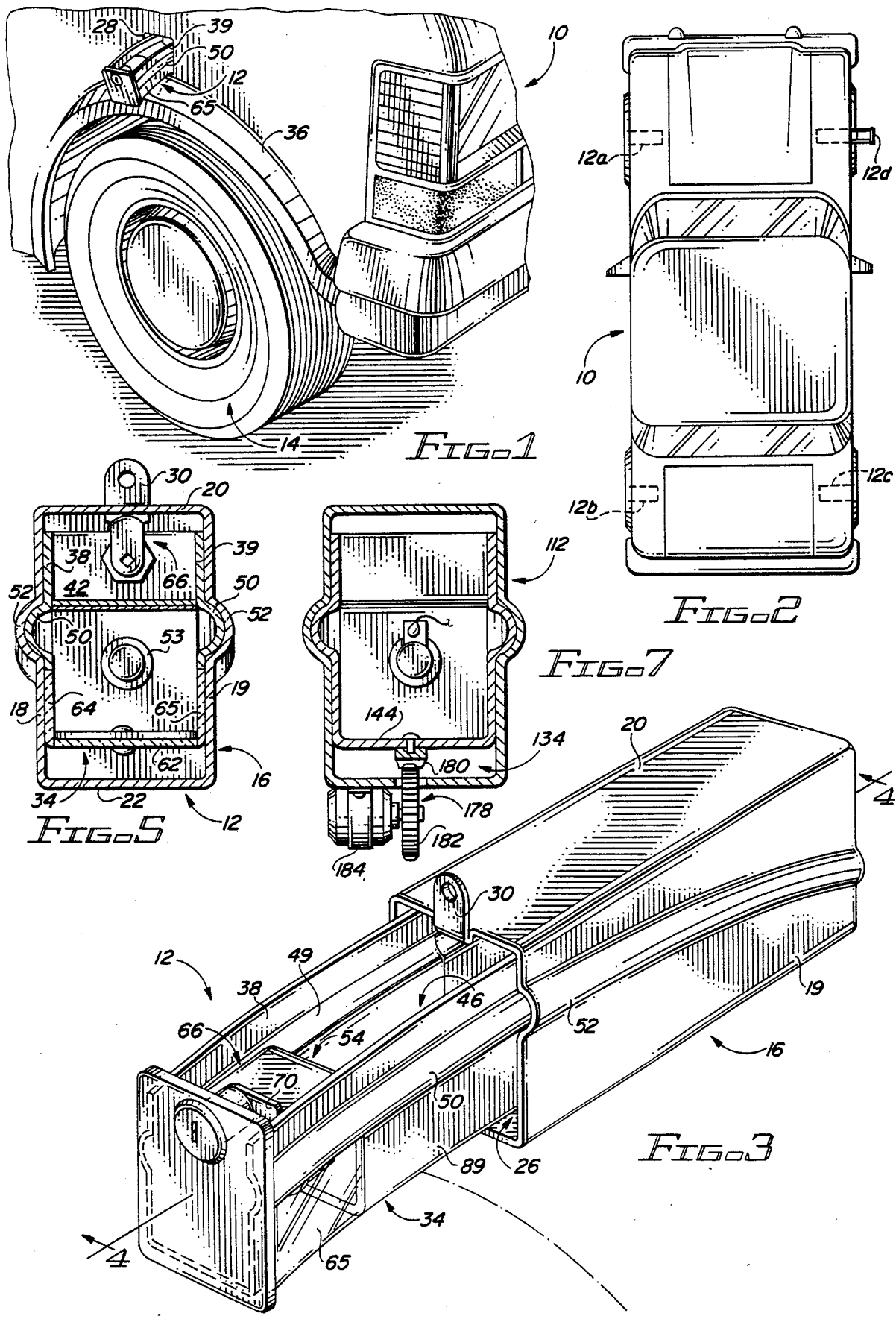

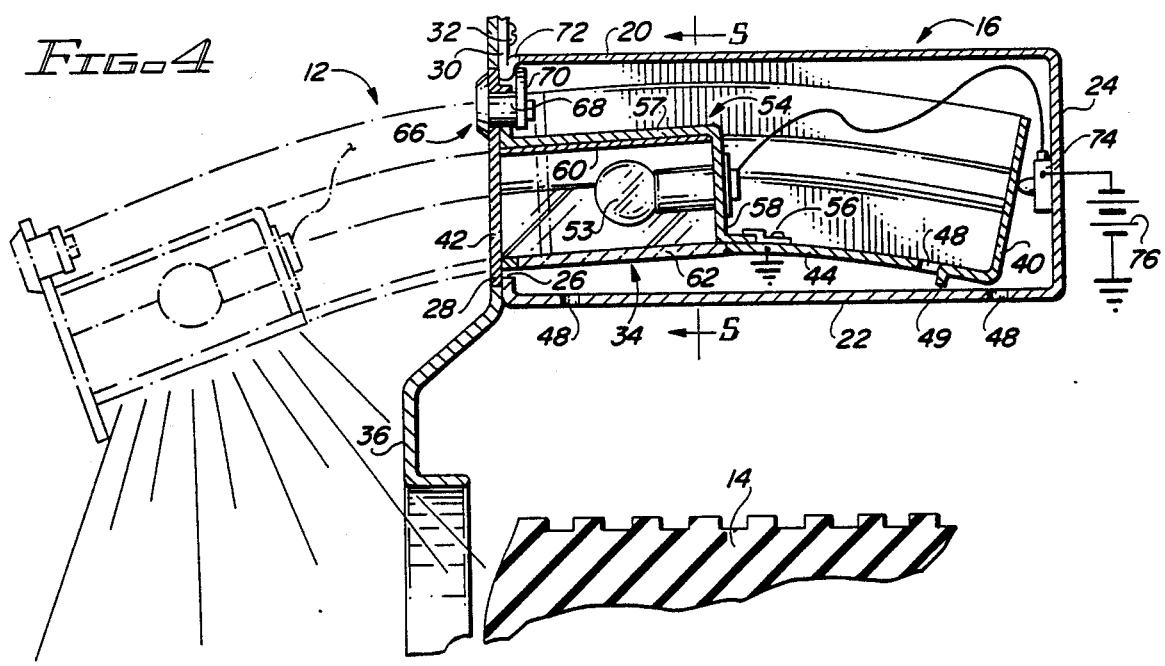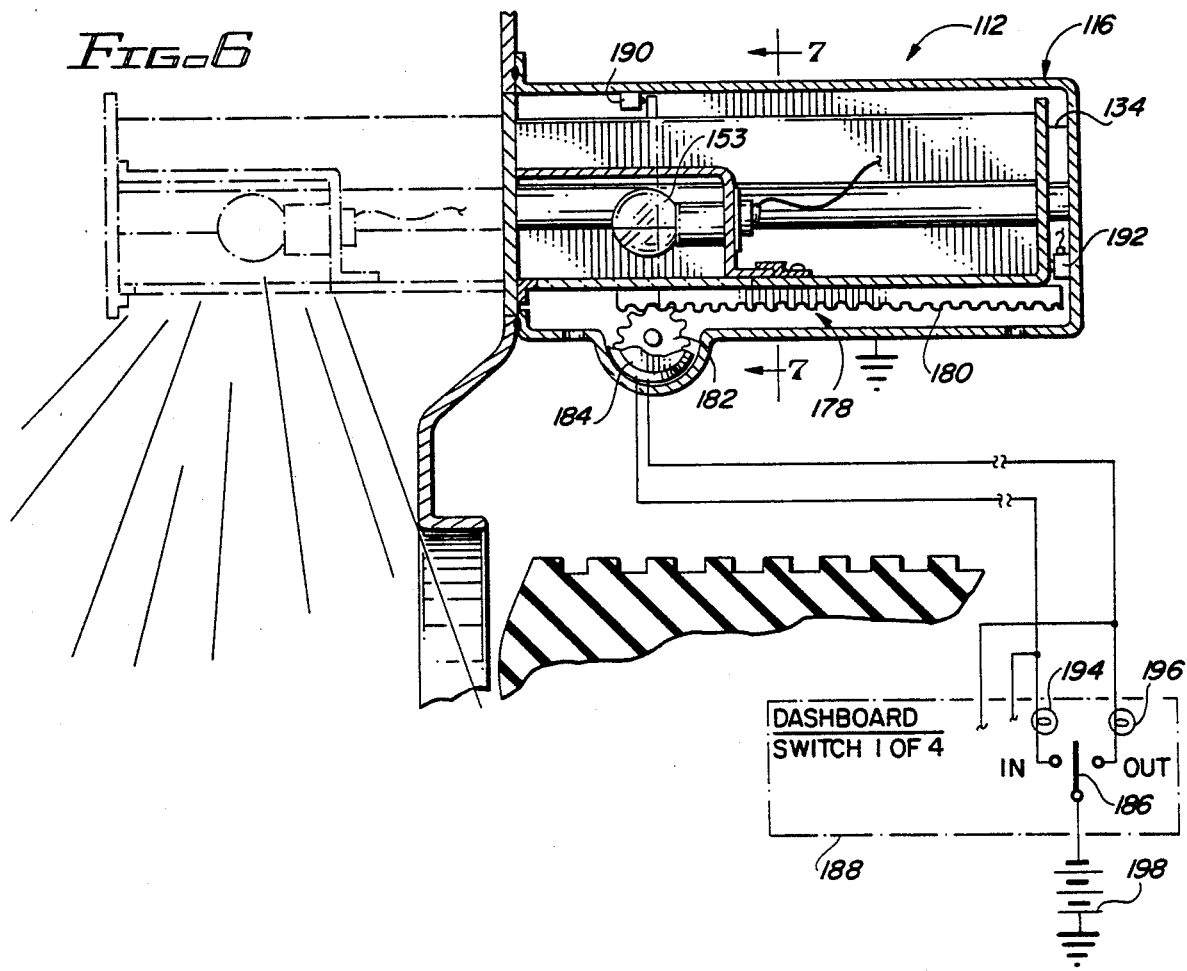

RETRACTABLE TIRE CHANGE LIGHTS FOR AUTOMOTIVE VEHICLES

CROSS-REFERENCE TO RELATED APPLICATION

This application is a continuation-in-part of my earlier application entitled "Retractable Tire Change Lights For Automotive Vehicles," which was filed on Apr. 22, 1988 and assigned serial number 184,937 and is now U.S. Pat. No. 4,802,069.

BACKGROUND OF THE INVENTION

1. Field of the Invention

This invention relates in general to automotive accessories and, more particularly, to a set of retractable lights mounted in or near the wheel wells of an automotive vehicle for illuminating the tires during a tire change.

2. Description of the Prior Art

The process of changing or repairing an automobile tire at night can be a frustrating as well as highly dangerous experience, especially for drivers who are travelling alone on poorly lit roads. Many drivers carry portable light sources such as flares or flashlights in anticipation of such emergencies; however, many others are totally unprepared. Even those who do have their own light sources have difficulty, since it is extremely awkward to hold a light in one hand while changing a tire with the other. In addition, since most of the light from the portable source is directed inwardly towards the damaged tire rather than outwardly towards the road, it generally can not be seen by oncoming vehicles until relatively late, when the person changing the tire is at a risk of being hit.

Various attempts have been made to devise vehicle lighting systems which overcome the above-mentioned problems. Examples of these attempts can be found in U.S. Pat. No. 2,065,876 (Siegfried), U.S. Pat. No. 2,503,974 (Sparaco), and U.S. Pat. No. 3,439,326 (Boudin). However, each of these lighting systems suffers from certain shortcomings which have prevented them from commercial acceptance.

The patent to Siegfried, for instance, discloses a set of four stationary lights mounted on the opposite sides of the roof of a motor vehicle. Two of the lights are directed laterally and forwardly of the vehicle, while the other two lights are directed laterally and rearward thereof. The lighting system of Siegfried partially illuminates the area around the vehicle's tires and thus would be some help in tire-changing operations. However, because the lights are directed at the sides of the road rather than specifically at the tires, the visibility of the tires would not be increased as much as desired. In addition, because the lights are mounted on the exterior of the vehicle, they are vulnerable to damage from vandals and poor weather conditions, and also detract from the vehicle's appearance and aerodynamic performance.

The patent to Sparaco discloses a repair and warning lamp connected to the end of a tube which is slidably mounted in a housing attached to one end of a vehicle. Normally, the light is stored in a retracted, off position, but when needed, it can be pulled out laterally at a distance of three feet to illuminate one side of the road. However, the lighting system of Sparaco utilizes a mounting arrangement which is suitable for mounting only a single lamp on one end of a vehicle, and is therefore not capable of providing equal illumination for all four of a vehicle's tires. If the lamp was mounted on the left rear side of the vehicle, for instance, it would be virtually useless for a flat on the right front side unless the driver were to take it off and remount it in a new position. In addition, like the lighting system of Siegfried, it would be vulnerable to vandalism, theft, and weather damage because of its location on the exterior of the vehicle.

U.S. Pat. No. 3,439,326 (Boudin) discloses a "pop-up" type blinker light the end of a telescopic piston rod which is mounted for reciprocation within a cylindrical housing secured to a vehicle body. Because the light is normally stored in the interior of the vehicle body, it is relatively well protected from vandalism and weather damage. However, because it is a warning light rather than a repair light, it does not direct light toward the wheel areas of a vehicle, and thus would be of little help to a driver changing a tire.

Other patents of interest include U.S. Pat. No. 1,245,527 (Szubski), U.S. Pat. No. 1,981,093 (Conarroe), and U.S. Pat. No. 2,275,260 (Kalisz). All three of these patents disclose turning signals, however, and are not directly applicable to the problem of illuminating the tires of a vehicle during a tire-changing operation.

Therefore, a need exists for a new and useful set of tire change lights which overcome the problems of the prior art.

SUMMARY OF THE INVENTION

In accordance with the present invention, a new and useful set of tire change lights is provided for illuminating the tires of an automotive vehicle during a tire-changing operation.

The set comprises four lights, each of which is mounted near the wheel well above a different one of the vehicle's tires. Each light includes a light source, such as a light bulb, which is mounted inside a lamp housing. The lamp housing, in turn, is mounted for reciprocation from a retracted position within a concealed stationary mounting case in the body of the vehicle to an extended position outside of the vehicle. The bottom wall of the lamp housing is provided with a lens which allows light from the light source to illuminate the area around the tire. The light source is electrically connected in series to the battery of the vehicle by means of a normally open control switch mounted in the stationary mounting case. The switch closes to activate the light source when the lamp housing moves into its extended position and opens to deactivate the light source when the lamp housing moves into its retracted position.

In a first embodiment of the invention, each lamp housing is designed to be manually reciprocated between its retracted and extended positions. In a second embodiment, a motor driven apparatus is provided to allow an operator to automatically reciprocate the lamp housing from within the vehicle. In a third embodiment of the invention, instead of being mounted in an extendable housing, the light source is secured to the inside of a pivotable door which swings outwardly from the body of the car.

A main object of the invention is to provide a set of tire change lights which are normally stored in a concealed, retracted position in the body of an automotive vehicle in or near the wheel wells, but which can be extended outside of the vehicle body to illuminate the tires during a tire-changing operation.

Another object of the invention is to provide an automotive vehicle with a set of four retractable tire change lights, each of which, when in an extended position, emits light in the direction of a different one of the vehicle's tires.

Still another object of the invention is to provide a set of vehicle tire change lights which are durable, inexpensive to manufacture, and easy to install in an automotive vehicle.

The foregoing and other objects of the present invention, as well as the invention itself, may be more fully understood from the following description when read in conjunction with the accompanying drawings.

BRIEF DESCRIPTION OF THE DRAWINGS

FIG. 1 is a perspective view showing one of the tire changing lights of the present invention in an extended position above a tire of an automobile.

FIG. 2 is a top view of an automobile, showing three of the tire change lights of the present invention in a retracted position and a fourth light in an extended position.

FIG. 3 is a perspective view showing one of the tire change lights of the present invention in an extended position.

FIG. 4 is a sectional view taken through line 4—4 of FIG. 3.

FIG. 5 is a sectional view taken through line 5—5 of FIG. 4.

FIG. 6 is a sectional view, similar to FIG. 4, showing an alternative embodiment of the invention.

FIG. 7 is a sectional view taken through line 7—7 of FIG. 6.

DESCRIPTION OF THE PREFERRED EMBODIMENTS

Figure 8:
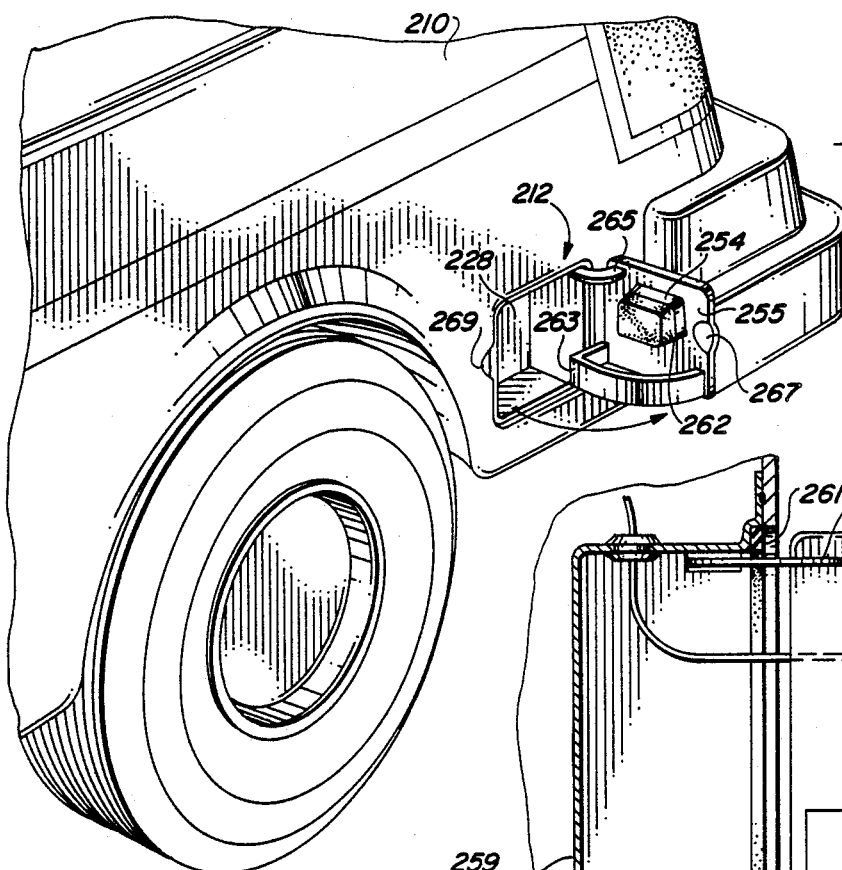
FIG. 8 is a perspective view of an automobile including a tire change light according to the third embodiment of the invention.

Referring more particularly to the drawings, FIG. 1 shows an automobile 10 equipped with a retractable tire change light 12 according to the present invention. The light 12 is actually one of a set of four tire change lights 12 a,b,c,d as shown in FIG. 4. For reasons of clarity, three of the lights 12 a,b,c,d are shown by phantom lines to be in concealed, retracted positions inside the body of the automobile 10, while the fourth light 12d, on the front right side of the automobile 10, is extended.

The exact position of the lights 12 a,b,c,d will vary from one model of vehicle to another. In FIG. 1, for instance, the light 12 is located in the wheel well of the automobile, directly above the oenter of the tire 14, while in other vehicles, it may be necessary to locate the light 12 to one side of the tire 14, due to insufficient space in the center of the wheel well. In any case, the distance between the light 12 and the tire 14 should be as small as possible to allow maximum illumination of the tire 14.

Each light 12 includes a stationary mounting case 16, which is located in a concealed position in the body of the automobile 10. Preferably, the mounting case 16 comprises a box-like structure including two spaced apart side walls 18,19, a top wall 20, a bottom wall or floor 22, and a rear wall 24. The front of the mounting case 16 defines an opening 26 which is aligned with a cut-out portion 28 formed in the body of the automobile 10 near the tire 14. A mounting bracket or similar support element 30 is provided on the front portion of the top wall 20 for receiving a fastener 32 for securing the mounting case 16 behind the cut-out 28.

Each mounting case 16 contains a lamp housing 34, which is mounted for reciprocation from a retracted position in which the lamp housing 34 is totally enclosed by the mounting case, as shown by the solid lines in FIG. 4, to an extended position in which the lamp housing protrudes through the cut-out 28 in the body of the automobile 10 and projects laterally beyond the fender area 36, as shown by the dotted lines in FIG. 4. In the illustrated embodiments, the lamp housing 34 is a drawer-like structure including a pair of spaced apart side walls 38, 39, a rear wall 40, a front wall 42, a bottom wall or flooz 44, and an open top portion 46. The front wall 42 is a face plate having appoximately the same dimensions of the cut-out portion 28 in the body of the automobile 10, and is preferably made from material of the same type and color as the rest of the automobile body 10 in order to be inconspicuous. However, the front wall 42 could also be made from chrome or the like if a more decorative appearance is desired. Both the bottom wall or floor 44 of the lamp housing 34 and the bottom wall or floor 22 of the mounting case 16 are provided with drainage ports 48 which prevent liquids from accumulating in the light 12 as a result of rain, dew, or other precipitation. In addition, the bottom wall 44 of the lamp housing 34 may include a stop member 49 for preventing the lamp housing 34 from being pulled entirely out of the mounting case 16.

The side walls 38, 39 of the lamp housing 34 are provided with guide means such as runners 50, which cooperate with mating tracks or grooves 52 in the mounting case 16 to guide the lamp housing 34 in the desired direction during reciprocation. The runners or guide means 50 and tracks 52 are preferably curved to direct the lamp housing downwardly as well as laterally, so that when the lamp housing 34 is fully extended, the light shines at an inward angle towards the tire 14, rather than straight down at the ground.

It is not necessary that the lamp housing 34 be formed as a drawer with an open top 46 and runners 48 as shown. For instance, in another embodiment (not shown), the lamp housing 34 could be configured as a closed box telescopically or collapsibly disposed within the mounting case 16. The illustrated, drawer like structure is preferred, however, because of its ease of manufacture. In addition, the open top 46 is convenient, because it allows the lamp housing 34, when extended, to double as a storage area for keeping lug nuts and the like while the tire 14 is being repaired or replaced.

Each lamp housing 34 contains a light source, such as a light bulb 53, which is mounted on any suitable surface in the front portion of the lamp housing 34. The light source or bulb 53 is preferably surrounded by an enclosure 54 which protects the light source 53 from damage due to bad weather or from objects being tossed into the open top portion 46 the lamp housing 34, or similar hazards. For best results, the enclosure 54 should be demountably secured to the lamp housing 34, by means of a flexible clamp or clip 56 on the floor of the lamp housing 34, for example, so that the light bulb 53 can be easily changed. The top and rear walls 57, 58 of the enclosure 54 should be opaque, so that light from the bulb or light source 53 will not be visible from above or behind. In addition, a layer of reflective material 60 may be provided on the lower surface of the top wall 56 to increase the intensity of the light shining in a downward direction. Similarly, the inner surface of the front wall 42 of the lamp housing 34 may be mirrored to reflect the light in the direction of the tire 14.

In the illustrated embodiments, the bottom wall 44 of the lamp housing 34 contains a clear lens 62 which allows light to travel in a downward direction. In addition, the side walls 38, 39 of the housing may contain amber or red colored lenses 64, 65 which warn motorists approaching from either direction that there is a disabled vehicle ahead. Of course, as mentioned earlier, in some automobiles it will more practical to mount the repair light 12 to one side of the tire 14, rather than directly above the tire 14 as shown. In such cases, the lens 64 or 65 in the side wall 38 or 39 facing the tire would be clear instead of colored, and the clear lens 62 in the bottom wall 44 could be eliminated.

In the embodiment of FIGS. 3–5, the light 12 is provided with a conventional, manually operable lock 66 which prevents vandals and mischievous children from tampering with the lamp housing 34. To activate the light 12, a user must insert a key (not shown) into the lock 66, rotate the tumbler 68 until the tang 70 clears the catch 72 on the top of the mounting case 16, and then pull the lamp housing 34 outwardly into its extended position. The outward motion of the lamp housing 34 causes normally open control switch 74 mounted on the rear wall 24 of the mounting case 16 to close, thus completing an electrical circuit with the automobile battery 76 and turning on the light bulb 53.

In a second embodiment, shown in FIGS. 6 and 7, and identified in its entirety by the numeral 112, the lock 66 is eliminated, and a motor driven apparatus 178 is provided for reciprocating the lamp housing 134 between its retracted position, shown by the solid lines in FIG. 6, and its extended position, shown by the dotted lines in FIG. 6. The apparatus 178 preferably comprises a rack 180 mounted on the bottom wall 144 of the lamp housing 134. The teeth of the rack 180 mesh with the teeth on a pinion 182 mounted on the output shaft of an electric motor 184. The electric motor 184 is connected in series to a three-way control switch 186 which can be actuated from the dashboard 188 to move the lamp housing 134 either forwardly or rearward while the driver is in the vehicle. In addition, a forward limit switch 190 is mounted near the front of the mounting case 116 for shutting off the motor 184 when the lamp housing 134 has moved all the way into its extended position, and a rear limit switch 192 is mounted in the back of the mounting case 116 for shutting off the motor 184 when the lamp housing 134 has returned to its retracted position. The rear limit switch 192 is preferably a normally open switch connected in series to both the electric motor 184 and the light source 153, while the front limit switch 190 is connected only to the electric motor 184. Thus, both the motor 184 and the light source 153 switch on when the lamp housing 134 begins to move out of the retracted position, and when the lamp housing 134 reaches the its fully extended position, the motor 184 shuts off, but the light source 153 remains on. Indicator lights 194, 196 may be provided in series with the control switch 186 to signal when the lamp housing 134 is moving from one position to the other.

Preferably, the control switch 186 is one of a set of four identical switches connected in parallel to the vehicle battery 198, each of which is connected in series to a different tire repair light 112 so that the four lights can be operated independently of one another.

Figure 10:
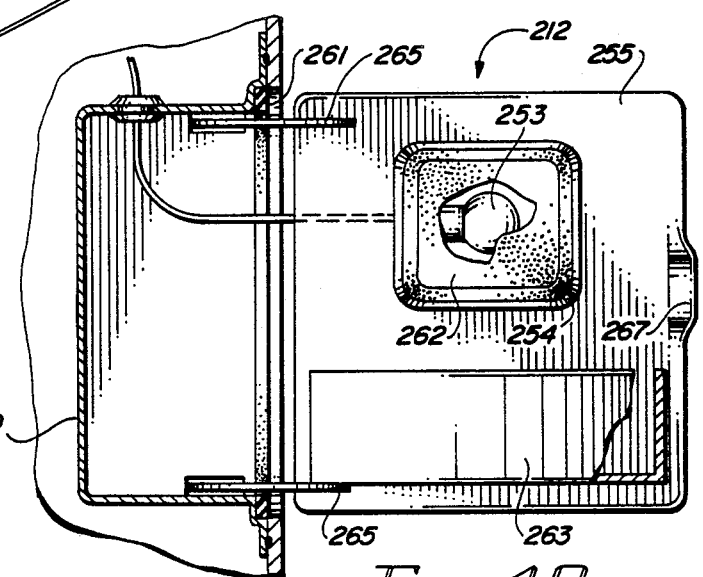
FIG. 10 is a side view of the tire change light of FIG. 9, with a portion of the lens broken away for greater clarity.
Figure 9:
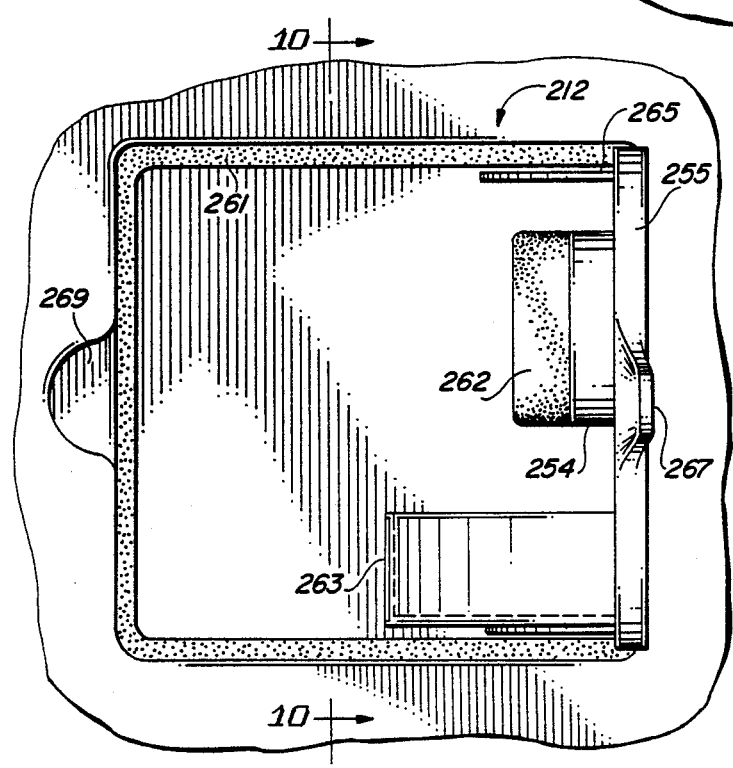
FIG. 9 is a front view of the tire change light of FIG. 8.

In a third embodiment of the invention, illustrated in FIGS. 8–10, the light assembly 212 comprises a light source 253 mounted on a pivotable door 255 which swings in and out of the cut-out 228 in the body of the automobile 210. This embodiment of the invention is particularly suitable for use in automobiles in which the wheel well is too shallow to accommodate the elongated reciprocal assembly of the other two embodiments.

As in the earlier embodiments, the light source 253 is preferably surrounded by a protective enclosure 254, the front portion of which includes a clear lens 262 for allowing light to be emitted in the direction of the tire 214. In addition, further protection is provided by a box-like casing 259 mounted in the interior of the cut-out 228. The casing 259 isolates the inner surface of the door 255 from the underside of the automobile 210 so that stones and the like tossed up by the motion of the tires 214 do not damage the lens 262 or other portions of the light assembly 212. Preferably, a sealing ring 261 is mounted in the mouth of the casing 259 in order to prevent moisture from entering the assembly when the door 255 is shut. Still another feature of this embodiment is a tray member 263 mounted below the light enclosure 254, providing a convenient storage area for lug nuts and other small articles needed during the tire-changing operation.

The door 255, which is connected to the casing 259 by means of hinges 263, is similar in structure to a conventional door of the type used to cover an automotive gas tank. Like the face plate 42 of the first embodiment, the outer surface of the door may be painted the same color as the rest of the automobile, so as to be inconspicuous when closed, or it may be given a more decorative appearance by constructing it from chrome, stamping it with an emblem, or other means. In the illustrated embodiment, the door 255 is provided with a thumb tab 267, and a mating notch 269 in the body of the automobile 210, which facilitate manual opening of the door. In other embodiments, the door could be provided with a lock, or with a spring loaded opening mechanism which is activated from inside the automobile.

The circuitry for the third embodiment of the invention would be similar to that of the previous embodiments, with a switch (not shown) being provided for completing a circuit with the automobile battery and turning on the light whenever the door 255 is opened.

While the principles of the invention have now been made clear in the illustrated embodiments, there will be immediately obvious to those skilled in the art, many modifications of structure, arrangements, proportions, the elements, materials and components used in the practice of the invention and otherwise, which are particularly adapted for specific environments and operation requirements without departing from those principles. The appended claims are therefore intended to cover and embrace any such modifications within the limits only of the true spirit and scope of the invention.

What I claim is:

1. A tire-changing safety assembly comprising in combination:

(a) an automotive vehicle having a body and a plurality of tires, each of said tires being mounted for rotation in a different wheel well in said body;

(b) a plurality of cut-outs formed in the body of said vehicle, each of said cut-outs being formed proximate a different one of said wheel wells; and (c) a plurality of tire change lights, each of said lights being mounted in a different one of said cut-outs, each of said lights comprising:

(i) a pivotable door mounted for swinging movement from a closed position covering one of said cut-outs to an open position extending outwardly from said vehicle;

(ii) a light source mounted on the inner surface of said pivotable door; and (iii) a box-like casing mounted in the interior of said cut-out for isolating said light source from the underside of said vehicle.

2. The tire-changing safety assembly of claim 1, in which said light source is surrounded by a protective enclosure, said protective enclosure including a clear lens for allowing light to be emitted in the direction of a tire.

3. A tire change light for mounting proximate one of the wheel wells of an automotive vehicle to illuminate one of the tires of the vehicle during a tire-changing operation, said tire change light comprising:

(a) a box-like casing for mounting in the interior of the body of the vehicle, said casing having an open front end for alignment with a cut-out portion in the body of the vehicle;

(b) a pivotable door member hingedly connected to said casing for swinging movement from a closed position covering the open front end of said casing to an open position substantially perpendicular to said vehicle; and (c) a light source mounted on the inner surface of said door for illuminating a tire of said vehicle when said door is an open position.

4. The tire change light of claim 3, in which said light source is surrounded by a protective enclosure, said protective enclosure including a clear lens for allowing light to be emitted in the direction of a tire.

5. The tire change light of claim 3, further comprising a storage tray mounted on the inner surface of said door beneath said tray.

6. The tire change light of claim 3, further comprising a sealing member mounted in the open front end of said box-like casing for preventing moisture from entering said tire change light when said door is closed.

7. The tire change light of claim 3, in which said door further comprises a thumb tab for facilitating manual opening of said door.

8. A tire-changing safety assembly comprising in combination:

(a) an automotive vehicle having an interior portion including a dashboard with a control panel and an outer portion including a body and four tires, each of said tires being mounted below a fender over a different one of four wheel wells in said body;

(b) four cut-outs formed in the body of said vehicle, each of said cut-outs being formed proximate a different one of said four wheel wells;

(c) a set of four tire change lights, each of said lights being mounted in a different one of said cut-outs, each of said lights comprising:

(i) a box-like casing for mounting in the interior of the body of the vehicle, said casing having an open front end for alignment with a cut-out portion in the body of the vehicle;

(ii) a pivotable door member hingedly connected to said casing for swinging movement from a closed position covering the open front end of said casing to an open position substantially perpendicular to said vehicle; and (iii) a light source mounted on the inner surface of said door for illuminating one of the tires of said vehicle when said door is an open position.

9. The tire changing safety assembly of claim 8, in which said light source is surrounded by a protective enclosure, said protective enclosure including a clear lens for allowing light to be emitted in the direction of a tire.

10. The tire changing safety assembly of claim 8, further comprising a storage tray mounted on the inner surface of said door beneath said tray.

11. The tire changing safety assembly of claim 8, further comprising a sealing member mounted in the open front end of said 12. The tire changing safety assembly of claim 8, in which said door further comprises a thumb tab for facilitating manual opening of said door.

13. A tire-changing safety assembly comprising in combination:

(a) an automotive vehicle having a body and a plurality of tires, each of said tires being mounted for rotation in a different wheel well in said body;

(b) a plurality of cut-outs formed in the body of said vehicle, each of said cut-outs being formed proximate a different one of said wheel wells; and (c) a plurality of tire change lights, each of said lights being mounted in a different one of said cut-outs, each of said lights comprising:

(i) a pivotable door mounted for swinging movement from a closed position covering one of said cut-outs to an open position extending outwardly from said vehicle;

(ii) a light source mounted on the inner surface of said pivotable door; and (iii) a storage tray mounted on the inner surface of said tray beneath said light source.

* * * * *